(12) United States Patent
Allen et al.

(10) Patent No.: US 6,522,734 B1
(45) Date of Patent: Feb. 18, 2003

(54) TRANSACTION BILLING FOR SPECIAL SERVICE TELEPHONE NUMBERS

(75) Inventors: Curtis E. Allen, Colorado Springs, CO (US); Phillip D. Crable, Falcon, CO (US); Shannon S. Smith, Monument, CO (US); Deanna D. Willoughby, Colorado Springs, CO (US)

(73) Assignee: MCI WorldCom, Inc., Jackson, MS (US)

( * ) Notice: Subject to any disclaimer, the term of this patent is extended or adjusted under 35 U.S.C. 154(b) by 0 days.

(21) Appl. No.: 09/224,489

(22) Filed: Dec. 31, 1998

(51) Int. Cl.[7] .............................................. H04M 15/00
(52) U.S. Cl. ............................ 379/114.29; 379/114.28; 379/114.24
(58) Field of Search ................... 379/112, 115, 379/221, 220, 114, 219, 265, 266, 309, 113, 114.28, 114.29, 121.01, 114.05, 114.24, 114.25, 201.01, 220.01, 221.08, 221.09, 221.11, 221.12, 230

(56) References Cited

U.S. PATENT DOCUMENTS

| | | | | |
|---|---|---|---|---|
| 5,008,929 A | * | 4/1991 | Olsen et al. ................ | 379/115 |
| 5,511,113 A | * | 4/1996 | Tasaki et al. ................ | 379/112 |
| 5,530,744 A | * | 6/1996 | Charalambous et al. .... | 379/265 |
| 5,537,611 A | * | 7/1996 | Rajagopal et al. .......... | 379/114 |
| 5,572,579 A | * | 11/1996 | Orriss et al. ................ | 379/142 |
| 5,703,940 A | * | 12/1997 | Sattar et al. ................ | 379/201 |
| 5,787,160 A | * | 7/1998 | Chaney et al. .............. | 379/220 |
| 5,850,432 A | * | 12/1998 | Desai et al. ................ | 379/115 |
| 5,854,834 A | * | 12/1998 | Gottlieb et al. ............. | 379/113 |
| 5,892,822 A | * | 4/1999 | Gottlieb et al. ............. | 379/220 |
| 5,920,621 A | * | 7/1999 | Gottlieb ...................... | 379/265 |
| 6,049,712 A | * | 4/2000 | Wallinder ................ | 379/93.03 |
| 6,148,070 A | * | 11/2000 | Meek et al. ................. | 379/210 |

* cited by examiner

*Primary Examiner*—Rexford Barnie

(57) ABSTRACT

A telecommunications network includes computing intelligence for billing call processing on a per transaction basis. In particular, a customer is charged separately for each usage of a remote computing resource that assists in call processing. The remote computing resource, may be, for example, an intelligent call router located within the telecommunications network or on a customer's premises. The transaction billing performed by the present invention results in equitable billing of customers based upon use.

17 Claims, 5 Drawing Sheets

TRANSACTION BILLING FOR SPECIAL SERVICE TELEPHONE NUMBERS

TECHNICAL FIELD

The present invention relates generally to telecommunications systems and more particularly to transaction billing for special service telephone numbers.

BACKGROUND OF THE INVENTION

Enhanced call services provide added services, such as call routing, voice mail services, paging services, facsimile services and interactive voice services, that are not available with conventional telephone services. Enhanced call services are generally provided within telecommunications networks via computer platforms. These computer platforms are located external from and independent of the switches that are in the telecommunications network to direct calls to their destinations. The computer platforms execute application computer programs that identify appropriate routing terminations for incoming calls. Service control points (SCPs) or data access points (DAPs) are examples of computer platforms that provide enhanced call services. The DAPs are found, for example, in the long distance telephone network of MCI Communications Corporation.

Enhanced call services may be provided for call centers. Call centers are facilities that provide support or sales services. Typically, a call center includes a number of operator stations that are manned by human operators to answer incoming calls on. The operators may not only field calls but may also initiate calls to perform support, sales or other functions. Call centers may employ automated call processing of incoming calls. Call centers may use advanced calling features and services such as intelligent routing, fax on demand or network queuing.

One example of a computer platform that provides enhanced call services for call center customers is an intelligent call router (ICR). The ICR acts as a routing engine for calls which can provide more termination options based on external information (e.g. time of day, day of week, or call load of operator center) or internal information (e.g. area code of caller or caller entered digits) than the SCPs. The ICR is a computer platform that is discrete from the SCP and often is located remotely from the SCP. The ICR is a computer system, such as a mini-computer, with specialized software that provides call routing solutions more flexibly and more quickly than an SCP. During call processing, the SCP forwards a call processing query to the ICR to process a call that fulfills a predefined criteria (e.g. a call with a particular ANI value). The ICR processes the call processing query and returns the results (i.e. a routing termination) to the SCP. The SCP then provides the results to the appropriate switch to route the call accordingly.

One difficulty with the above-described conventional approach is that a substantial number of resources are used for the ICR to assist in call processing. Hence, call center customers who use ICRs are charged in order to help recover the cost of developing, building, and using the resources. The customers are billed on a flat-fee basis, such as a fixed dollar amount per month. Unfortunately, such a flat-fee approach results in inequities. For instance, a customer who conducts 10,000 transactions per month with the ICR is billed the same amount as a customer who conducts 100 transactions per month with the ICR.

SUMMARY OF THE INVENTION

The present invention addresses the limitations of the prior art by facilitating transaction billing. As a result, customers are charged on a per transaction or per use basis rather than on a flat fee basis that does not vary with use.

In accordance with one aspect of the present invention a method is practiced in a telecommunications system that has a node, such as a service control point or DAP, for performing call processing on a call to a customer phone number. The telecommunications system also includes a remote computer platform for performing additional call processing on the call. In accordance with this method, a communication is sent from the node to the remote computer platform to perform additional call processing on the call. A charge is assessed for sending the communication and information regarding the charges is passed to the billing system so that the customer is billed for the charge.

In accordance with another aspect of the present invention, a method of processing a call for a customer is practiced in a telephone network. The telephone network includes an intelligent call router for routing calls and a database system for determining how to route calls. A call is received at the database system for further call processing. A query is generated and is sent to the intelligent call router. A charge is assessed to the customer for the query, and information is passed to the billing system so the customer is billed for charge.

In accordance with a further aspect of the present invention, a telecommunications system includes a node for receiving a call to a customer. A node includes a query generator for generating a query to determine how to route the call and a charge assessor for charging the customer for any queries generated by the query generator. The system additionally includes a remote computer platform for receiving queries from the node and for returning routing information to the node to route calls. A billing system is provided for billing the customers for calls. The billing system communicates with the nodes to charge the customer for charges assessed by the charges assessor.

In accordance with yet another aspect of the present invention, a method of billing a client for a call is practiced in a network. The call is received at a service control point that requests routing information from a remote computer resource. A transaction is initiated wherein routing information is solicited from the remote computing resource. The client is billed for the transaction of soliciting the routing information.

BRIEF DESCRIPTION OF THE DRAWINGS

An illustrative embodiment of the present invention will be described below relative to the following drawings.

DETAILED DESCRIPTION OF THE INVENTION

The illustrative embodiment of the present invention facilitates transaction billing for special services (i.e. services provided by a remote computer platform for selected telephone numbers). In particular, the illustrative embodiment bills customers on a per-transaction basis for calls that entail a call processing query to a discrete computer platform from a DAP. In this context, "per-transaction" refers to per call processing query to a remote computer platform, such as an ICR. Customers are not charged a flat fee for access to such discrete computer platforms that perform enhanced call services, but rather are charged on a per-transaction basis to reflect the extent to which such computer platforms are utilized. This results in a more equitable billing system for customers wherein customers are charged based upon their use of the resources and are not charged an arbitrary fixed amount that is unrelated to the extent of use of the resources. The illustrative embodiment is well adapted for use with call center customers. Specifically, call centers may provide enhanced call services to callers through the use of ICRS.

Figure 1:
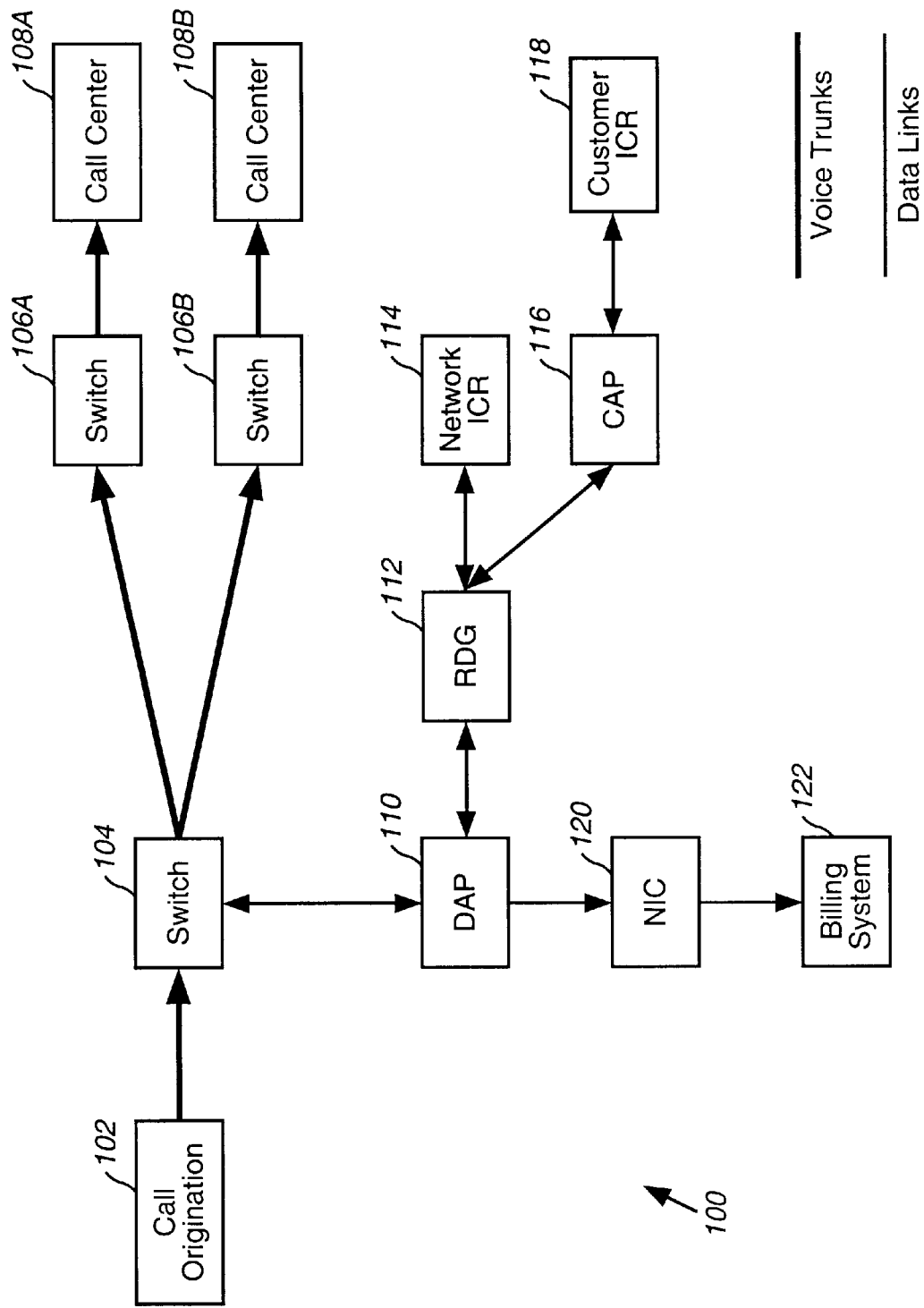
FIG. 1 depicts a telecommunications system that is suitable for practicing the illustrative embodiment of the present invention.

FIG. 1 depicts an example telecommunications network 100 that is suitable for practicing the illustrative embodiment of the present invention. Voice trunks are indicated by bold lines and data links are indicated by thin lines in FIG. 1. Those skilled in the art will appreciate that the depiction of the telecommunications network in FIG. 1 is intended to be merely illustrative and not limiting of the present invention. The present invention may also be practiced with other telecommunications network configurations that include additional components or fewer components than depicted in FIG. 1.

Figure 3:
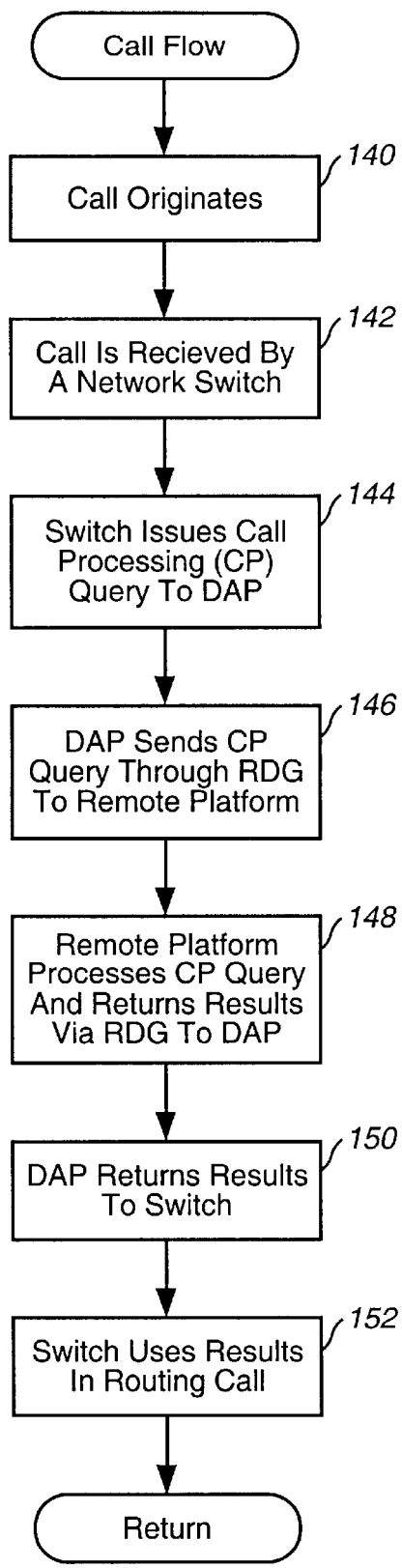
FIG. 3 is a flow chart illustrating an example call flow that is followed in the illustrative embodiment of the present invention.

The operation of the components of FIG. 1 will be described in conjunction with the flow chart of FIG. 3. The telecommunications network 100 comprises a call origination site 102 from which a caller originates a call (step 140 in FIG. 3). The origination site 102 may be, for example a telephone set that is used by a caller. Alternately, the call origination site 102 may be a computer system that includes a telephony circuit board for initiating calls. The call placed by the caller from the origination site reaches a switch 104 (Step 142 in FIG. 3) that directs the call on towards its destination. The switch 104 may be part of a telephone network such as a public switched telephone network (PSTN). The switch 104 may be, for example, a local exchange carrier (LEC) switch or an inter-exchange carrier (IXC) switch. The switch 104 may be realized as a digital cross matrix switch or as another variety of a conventionally known switching mechanism.

For purposes of the discussion below, it is assumed that the call is a special service call (i.e., an 8XX call or another unique variety of call that requires special processing by an ICR) that cannot be properly routed by the switch 104 without input from an external mechanism. Upon determining that the call is a special service call, the switch 104 issues a call processing (CP) query to DAP 110 (Step 144 in FIG. 3). The switch 104 may, for example, determine that all 8XX calls require a CP query to the DAP 110 or that all calls that the switch 104 does not know how to route require a CP query to the DAP. The DAP 110 is a type of service control point (SCP). The DAP 110 is a computing platform that provides additional call processing services. Call processing entails handling of the calls and/or routing of the calls. The DAP 110 may be implemented as a single computer system or as a cluster that includes multiple computers. The database used by the DAP 110 includes call processing (CP) applications and data that guide the DAP in identifying how to process incoming calls.

Figure 2:
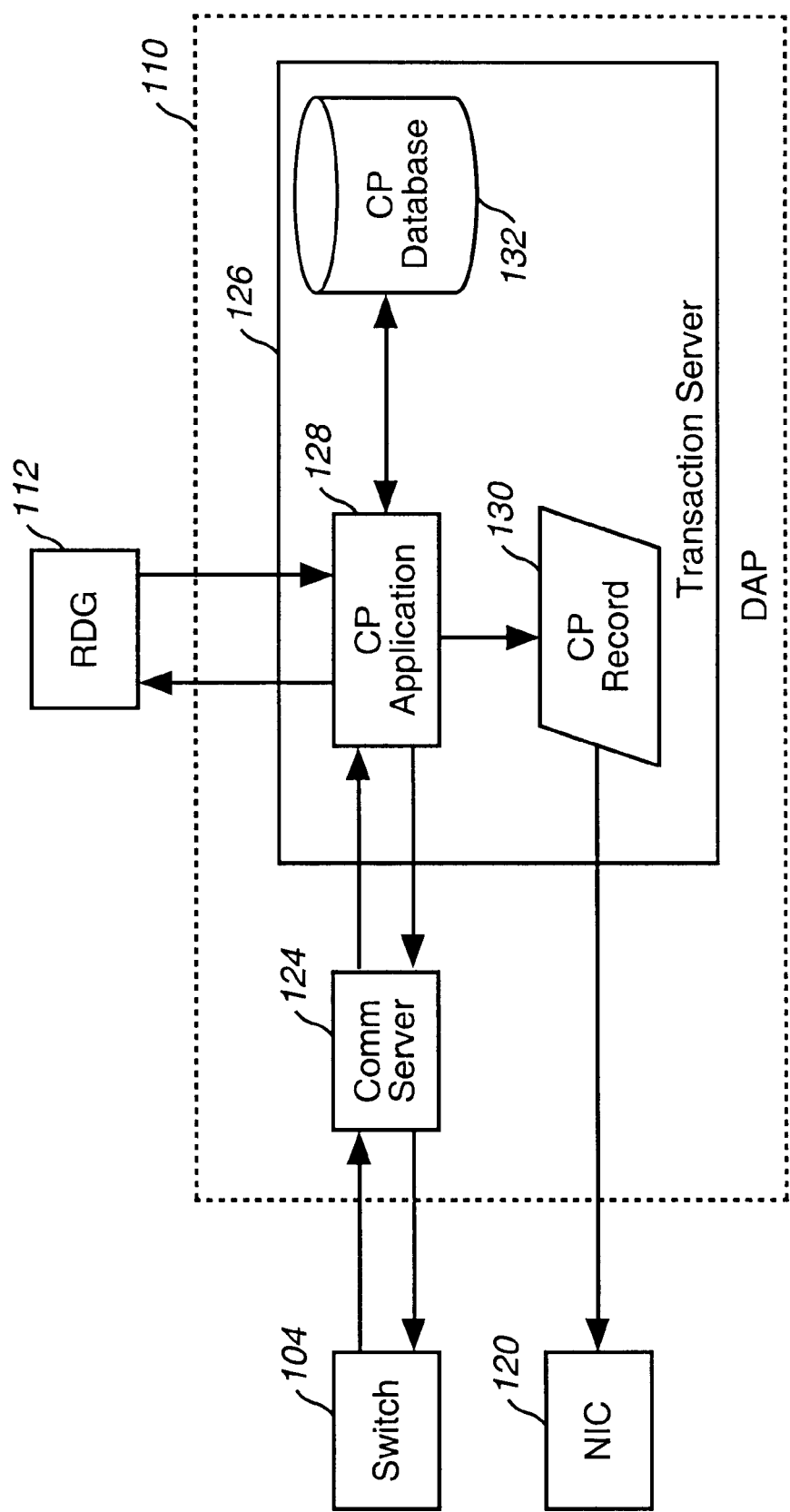
FIG. 2 depicts the data access point (DAP) 110 of FIG. 1 in more detail.

FIG. 2 depicts the DAP 110 in more detail. The DAP 110 may be viewed as a database system that includes a database of call routing information. The DAP includes a communication server 124 and a transaction server 126. The communication server 124 is responsible for serving as an interface between the transaction server 126 and the switch 104. Multiple servers may work cooperatively to provide the functionality of the communication server 124. They may be connected to the transaction server via a local area network (LAN), such as an FDDI ring. A CP application 128 runs on the DAP 110 to process queries from switch 104. The CP application 128 uses the CP database 132 that holds call processing information to determine how to route a call based upon criteria. The CP application 128 also creates a CP record 130 that plays a role in billing, as will be described in more detail below.

The DAP 110 processes the CP query that was received from switch 104 to determine how to route the call. For example, if the call is to be sent to Call Center 108A or 108B, the DAP 110 returns query results to the switch 104 that provide routing termination information for appropriately directing the call. The call is then passed through switches 106A or 106B onto the appropriate Call Center 108A or 108B in such a case.

In the present instance, the DAP 110 runs a CP application 128 that includes a trigger point for recognizing that the call is to be processed by a remote platform, such as ICR 114 or ICR 118. The ICRs 114 and 118 act as routing engines that include routing information for special service telephone numbers. In the illustrative embodiment, the address digits "Cdpn" provided for the call is used to identify the call as requiring routing feedback from an ICR. In other words, the DAP 110 looks up the telephone number in its database 132 and determines that a CP query must be submitted to a remote ICR. The transaction server 126 acts as a query generator to generate a CP query. The DAP 110 sends the CP query through a remote data gateway (RDG 112) to a remote computer platform (Step 146 in FIG. 1). The RDG 112 provides a communication process interface between the DAP 110 and the ICRs 114 and 118. More details regarding the RDG are provided in co-pending application 08/796,246, which is assigned to a common assignee with the present application and which is explicitly incorporated by reference.

In the example depicted in FIG. 1, the CP query is directed to either network ICR 114 or Customer ICR 118. The ICRs 114 and 118 are computer platforms that are located remotely from the DAP 110. The CP query must pass through a customer access point (CAP) 116 to reach the customer ICR 118. The network ICR 114 is part of a long distance telephone network. The customer ICR 118, in contrast, is part of a customer's local computing network and may be located on the customer premises. The call handling decisions made by the ICRs 114 and 118 may vary based on dates and times. For example, a customer may request that all calls to their 800 numbers that are received Monday through Friday be handled in a first fashion. At other times, the calls may be handled in a secured fashion. A trigger point is inserted into the CP application 128 that is run on the DAP 110 to appropriately generate queries when it is determined that the calls to the customer number are received Monday through Friday or alternately on Saturday or Sunday.

The DAP 110 sends the CP query through the RDG 112 to one of the ICRs 114 or 118. The destination ICR 114 or 118 receives the CP query, processes the CP query and returns the results via the RDG 112 to the DAP 110(Step 148 in FIG. 3). The DAP 110, in turn, returns the results to the switch 104 (Step 150 in FIG. 3). The results identify a routing termination, and the switch 104 uses this information to appropriately Route the call (Step 152 in FIG. 3).

The illustrative embodiment bills customers on a per transaction or event basis. In particular, each time the DAP 110 submits a CP query out over the RDG 112, the customer is billed a specified amount (a "transaction fee" or an "event fee"). The customer may be additionally billed for other services that are rendered during the transaction. For instance, a customer may be billed for caller use of paging services as part of a call. Each call that is processed by the DAP 110 results in the production of a CP record 130. The CP record 130 is written by the CP application 128 to include a listing of any significant tasks that are performed on the call. The CP record 130 also includes a feature code that acts as a flag. The feature code may be a numerical routing sequence that encodes properties regarding the call. In the illustrative embodiment, a feature code value of "15" is used to indicate that the call is to be billed on a per transaction basis. A value of "00" for the feature code indicates that the call is not to be billed on a per transaction basis. When transaction billing is in effect for a call, the feature code has a value of "15."

Figure 4:
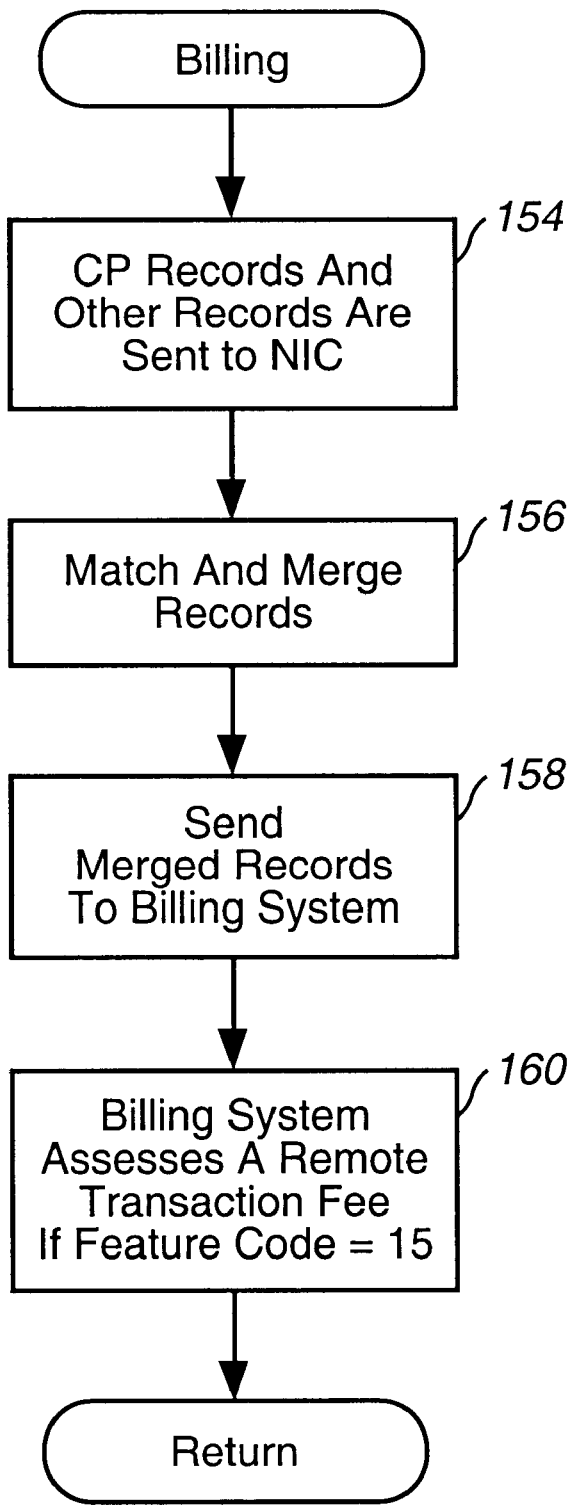
FIG. 4 is a flow chart illustrating the steps that are performed to realize transaction billing in the illustrative embodiment.

FIG. 4 is a flow chart illustrating the steps that are performed to realize transaction billing in the illustrative embodiment. The CP record and other billing records generated during the call are sent from the DAP 110 to a network information concentrator (NIC) 120 (Step 154 in FIG. 4). The NIC 120 is a computer system that collects all the various records created for the call, including call detail records from the switch 104 and matches the various records to merge the records into a single record for billing (Step 156 in FIG. 4). The NIC 120 sends the billing record to a billing system 122 (Step 158 in FIG. 4). The NIC 120 is described in more detail in co-pending application 08/426,256, which is assigned to a common assignee with the present application and which is explicitly incorporated by reference herein. The billing system 122 uses these records to generate the appropriate billing statements and to charge the appropriate customer accounts (Step 160 in FIG. 4). The billing system 122 is run on a computer system to generate invoices for customers that itemize charges. When the billing system 160 sees a feature code value of "15," the billing system knows to charge a transaction fee for the CP query that was sent to the ICR 114 or 118.

Figure 5:
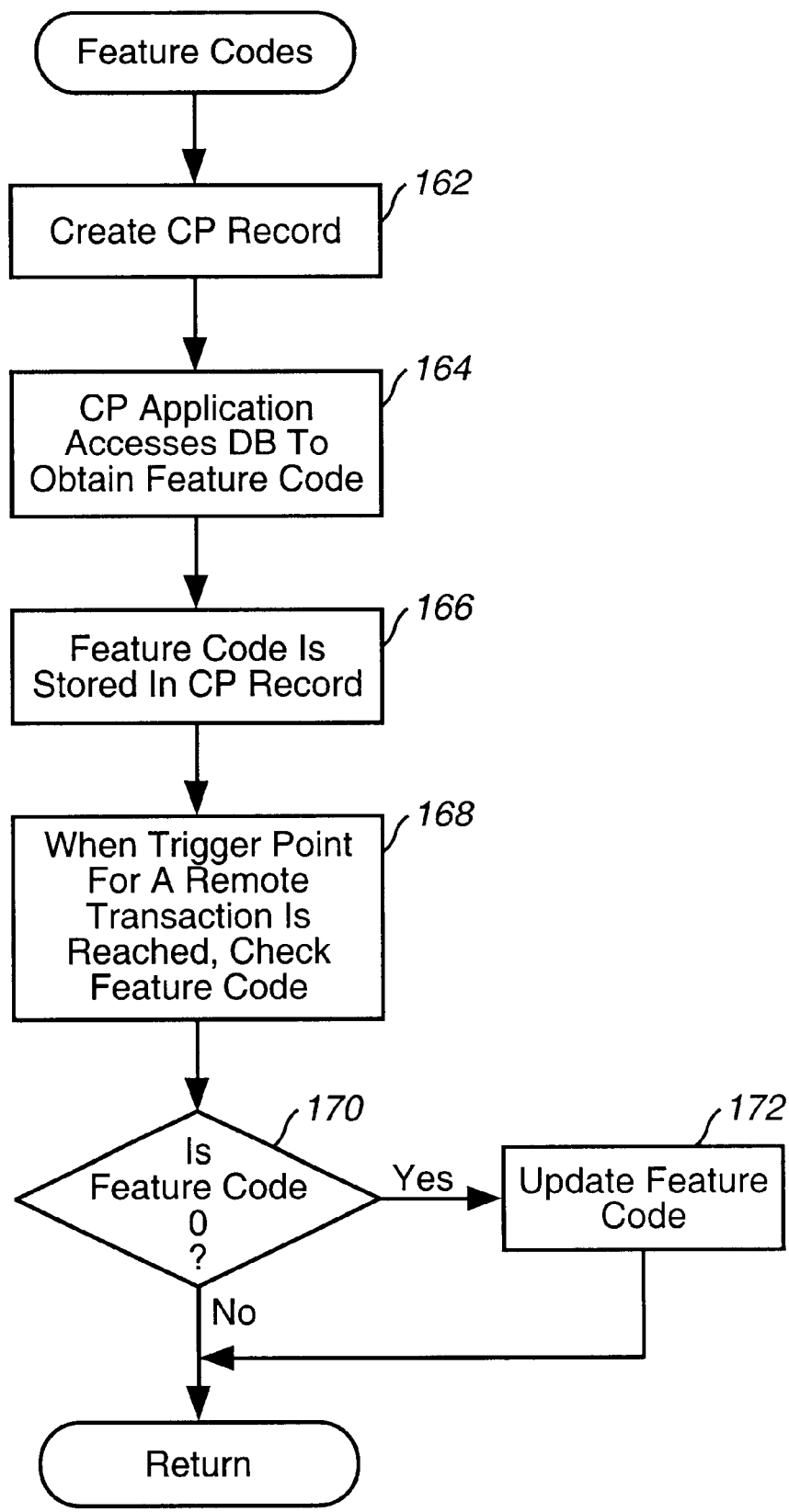
FIG. 5 is a flow chart illustrating the steps that are performed to use feature codes in transaction billing.

FIG. 5 illustrates the steps that are performed to establish a proper feature code value to facilitate transaction billing in the illustrative embodiment of the present invention. Initially, the CP record 130 is created as has been described above (Step 162 in FIG. 5). The CP application 128 then accesses the CP database 132 to obtain a feature code for the call (Step 164 in FIG. 5). For calls that are to be routed to the network ICR 114 or the Customer ICR 118, the feature code is set at "15." This feature code value indicates that the calls have been routed over the RDG 112 through a remote computer platform for further routing processing and that the call is to be transaction billed. The feature code that is obtained from the CP database 132 is incorporated into the CP record 130 (Step 166 in FIG. 5). While the DAP 110 is executing a CP application 128, a trigger point is reached for a remote query to be sent out over the RDG 112. At this point and time, the CP application checks the feature code in the CP record 130 (Step 168 in FIG. 5). If the feature code has the value of "00," it is an indication that the call would otherwise not be billed. Thus, if the feature code has a value of "0" (Step 170 in FIG. 5), the feature code value is updated in the CP record 130 to have a value of "15" (Step 172 in FIG. 5) so that the call is billed on a per transaction basis.

While the present invention has been described with reference to an illustrative embodiment thereof, those skilled in the art will appreciate the various changes in form and detail may be made without departing from the intended scope of the present invention as defined in the appended claims. For example, feature codes need not be used; rather other mechanisms may be used to identify calls as being subject to transaction billing. Moreover, the feature code need not have a value of "15" to result in a call being transaction billed. Furthermore, transaction billing is not limited to the submission of queries to ICRs. Instead, transaction billing may be applied more generally to transactions that entail communications with remote computing resources to assist in call processing.

What is claimed is:

1. In a telecommunications system wherein a caller places a call to a customer phone number, said system having a service control point for performing call processing on the call and a remote computer platform for performing additional call processing, a method comprising:

including a database system in said service control point that holds a database of calling information;

sending a communication from the service control point to the remote computer platform to perform additional call processing on the call;

assessing a first charge for sending the communication;

assessing a second charge based on the additional call processing performed by the remote computer platform; and passing information regarding the first and second charges to a billing system so that the customer is billed for the first and second charges.

2. The method of claim 1 wherein the remote computer platform is an intelligent call router (ICR) that processes the call to determine how to route the call.

3. The method of claim 1 further comprising the step of receiving routing information for the call at the service control point from the remote computer platform in response to the communication.

4. The method of claim 3 further comprising the step of routing the call according to the routing information that is received at the service control point.

5. The method of claim 1 wherein the communication sent from the service control point includes a query.

6. The method of claim 1 further comprising the step of setting a flag so that the first and second charges are billed to the customer.

7. The method of claim 1 wherein the telecommunications network is a telephone network.

8. The method of claim 1 further comprising the step of receiving the call at the service control point and sending the communication in response to receiving the call.

9. The method of claim 1 further comprising the step of generating an invoice to the customer that includes the first and second charges.

10. The method of claim 1, wherein the additional call processing includes:

sending a pager message associated with the call and wherein the assessing a second charge includes:

assessing the second charge for use of a paging service to send the pager message.

11. In a telephone network having an intelligent call router and a service control point including a database system, a method of processing a call made by a caller to a customer, comprising the steps of:

receiving a call at the database system;

generating a query and sending the query to the intelligent call router;

generating routing information by the intelligent call router;

receiving, by the service control point, the routing information for the call from the intelligent call router in response to the query;

routing the call based on the received routing information;

assessing a first charge to the customer for the query to the intelligent call router;

assessing a second charge to the customer based on processing performed by the intelligent call router to generate the routing information; and passing information to a billing system so that the customer is billed for the first and second charges.

12. The method of claim 11 wherein the step of passing information comprises passing a record to the billing system that identifies the first and second charges to the customer.

13. The method of claim 12 wherein the record also includes a flag that indicates that the first and second charges are to be billed to the customer.

14. The method of claim 13 wherein the record includes a feature code and a specific feature code value indicates that the first and second charges are to be billed to the customer.

15. A telecommunications system comprising:

a service control point for receiving a call to a customer, said service control point including:

(i) a query generator for generating a query to determine how to route the call;

(ii) a charge assessor for charging the customer a first charge for the query generated by the query generator; and (iii) a database system including a database of routing information;

a remote computer platform for receiving the query from the service control point and for returning routing information to the service control point to route the call, wherein the charge assessor charges the customer a second charge for processing performed by the remote computer platform; and a billing system for billing the customer for calls, wherein said billing system communicates with the service control point to charge the customer for charges assessed by the charge assessor.

16. The telecommunications system of claim 15 wherein the remote computer platform is an intelligent call router.

17. The telecommunications system of claim 15, wherein when charging the customer for services performed relating to the call, the charge assessor is configured to:

charge the customer based on processing performed by the remote computer platform.

* * * * *